United States Patent
Smith

(10) Patent No.: US 7,158,019 B2
(45) Date of Patent: Jan. 2, 2007

(54) INTEGRATED LED WARNING AND VEHICLE LAMP

(75) Inventor: Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 42 days.

(21) Appl. No.: 10/912,278

(22) Filed: Aug. 5, 2004

(65) Prior Publication Data

US 2006/0028814 A1 Feb. 9, 2006

(51) Int. Cl.
*B60Q 1/50* (2006.01)

(52) U.S. Cl. .................. 340/467; 340/475; 340/439; 362/249; 362/303; 362/555

(58) Field of Classification Search .............. 340/467, 340/475, 439; 362/249, 555, 303
See application file for complete search history.

(56) References Cited

U.S. PATENT DOCUMENTS

| | | | |
|---|---|---|---|
| 4,211,955 A | 7/1980 | Ray | |
| 4,298,869 A | 11/1981 | Okuno | |
| 4,654,629 A | 3/1987 | Bezos et al. | |
| 4,868,719 A | 9/1989 | Kouchi et al. | |
| 5,426,414 A | 6/1995 | Flatin et al. | |
| 5,688,042 A * | 11/1997 | Madadi et al. | 362/240 |
| 5,806,965 A | 9/1998 | Deese | |
| 5,890,794 A * | 4/1999 | Abtahi et al. | 362/294 |
| 6,380,865 B1 | 4/2002 | Pederson | |
| 6,462,669 B1 | 10/2002 | Pederson | |
| 6,796,698 B1 * | 9/2004 | Sommers et al. | 362/555 |

* cited by examiner

*Primary Examiner*—Tai T. Nguyen
(74) *Attorney, Agent, or Firm*—Alix, Yale & Ristas, LLP

(57) ABSTRACT

An integrated LED warning and vehicle lamp according to aspects of the present invention has a base configured to directly replace an existing vehicle lamp by reception into the lamp's reflector shell. The integrated warning and vehicle lamp includes a first radial array of LEDs dedicated to producing the vehicle warning and/or illumination formerly produced by the vehicle lamp and a second radial array of LEDs dedicated to producing an emergency warning light signal. The second radial array may be electrically connected to an axial LED. The LEDs are supported by a lamp support at a location near the focus of the reflector shell. An interface electrical circuit modifies the electrical energy formerly fed to the vehicle lamp to a form appropriate for the LEDs in the first array. A warning signal electrical circuit energizes the second array of LEDs to produce the emergency warning light signal.

10 Claims, 4 Drawing Sheets

INTEGRATED LED WARNING AND VEHICLE LAMP

FIELD OF THE INVENTION

The present invention generally relates to vehicular emergency warning lights used to warn the public of the presence of an emergency vehicle and more particularly to a lamp which integrates a warning signal function with the functions of a standard vehicular lamp.

BACKGROUND OF THE INVENTION

The use of emergency vehicle signal devices for increasing the visibility of public service vehicles is well known in the art. Vehicles using such devices include emergency, police, municipal, and construction vehicles, among others. The most widely employed type of visual warning system is the roof-mounted light bar. Such a light bar includes a plurality of light generators arranged on a support that spans from side-to-side, and either rests upon or is spaced above, the roof of the emergency vehicle. While such light bars accomplish the purpose of producing a wide variety of highly visible light radiation patterns to warn the public of the presence of an emergency vehicle, prior art light bars possess certain inherent disadvantages. For example, such prior light bars tend to increase vehicle wind resistance, increase fuel consumption and produce turbulence that results in interior noise at high speeds. A traditional light bar also increases vehicle height, which may limit access to certain areas, or present the possibility of damage to property or the light bar itself where there is limited overhead clearance. Arguably the most significant drawback to a roof-mounted light bar in the context of law enforcement vehicles is that the presence of a light bar conspicuously identifies the nature of the vehicle.

The prior art discloses aerodynamic light bars, low profile light bars and light bars mounted against the inside of vehicle windows that address some of the disadvantages of traditional roof mounted light bars. Other alternative configurations include various combinations of grill or bumper-mounted warning lights, headlight flashers, warning lights mounted inside the vehicle on the dashboard, sun visors or rearview mirror, and warning lights integrated with the externally mounted rearview mirrors. With respect to warning lights placed inside the vehicle, vision at night can be problematic, due to reflection of the light into the interior of the vehicle.

One approach to providing an inconspicuous warning light is to place a strobe warning lamp in the reflector shells for the front and rear corner signal/running lamps. This has typically been accomplished by drilling a second opening in the reflector and installing a strobe base and bulb to project into the shell. One drawback of this procedure is the need to modify parts of the vehicle. Further, the strobe lamp cannot be arranged at the focus of the reflector and is thus rendered significantly less effective in its warning function. Strobe-type lamps are known to be relatively short lived and require frequent maintenance.

There is a continuing need for a new and improved emergency vehicle signal light that provides high visibility for an emergency vehicle while overcoming the disadvantages discussed above. The emergency vehicle light is preferably energy efficient and requires little or no maintenance.

SUMMARY OF THE INVENTION

Briefly stated, an integrated lamp according to aspects of the present invention includes a base configured for insertion in the aperture of a reflector shell provided for a standard vehicle lamp. A lamp support post extends from the base to provide a support surface for multiple light emitters. In one exemplary embodiment, the light emitters are arranged in two parallel circumferential arrays. One array is dedicated to producing the vehicle signal and/or illumination formerly produced by the standard vehicle lamp. The other array is dedicated to producing a warning light signal. The light emitters in the two arrays are positioned with their respective optical axes substantially perpendicular to a longitudinal axis of the lamp support post. An integrated lamp according to the present invention may include an axially oriented light emitter secured to the end of the lamp support post. The axial light emitter may be provided with a collimator to organize its light to a path aligned with the longitudinal axis of the lamp support post. The axial light emitter is electrically connected to the array producing the warning light signal, thereby enhancing the straight-ahead intensity of the warning light signal.

The light emitters are preferably high output LEDs and an aspect of the invention relates to an interface electrical circuit between the vehicle systems and the integrated lamp. The interface electrical circuit modifies the electrical power provided to the vehicle lamp to a form appropriate for the LEDs. A separate warning signal electrical circuit energizes the LEDs dedicated to generating the warning light signal. The warning signal electrical circuit may be centralized or each integrated lamp may be provided with its own warning signal electrical circuit. The warning light signals may be coordinated or asynchronous, according to the preference of the user.

DETAILED DESCRIPTION OF THE PREFERRED EMBODIMENT

Figure 1:
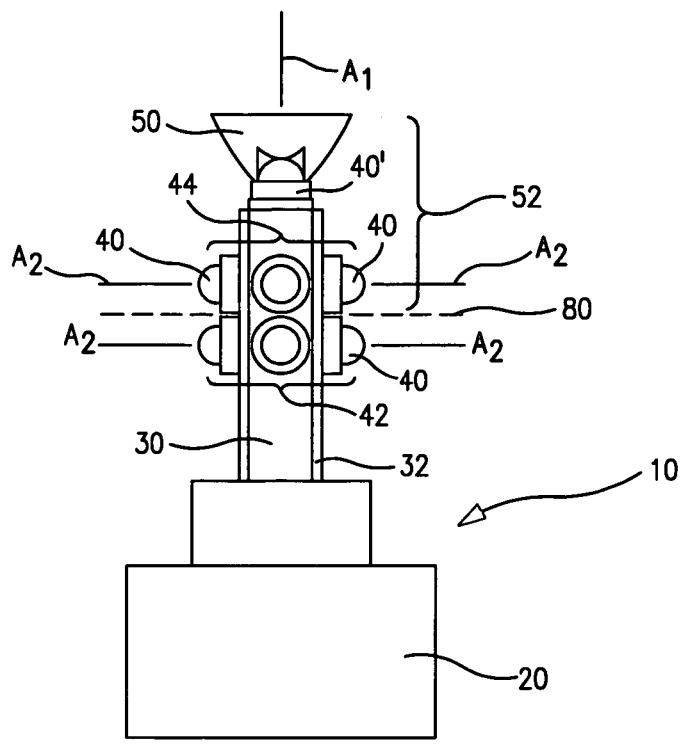
FIG. 1 is a side view of an integrated lamp according to aspects of the present invention.
Figure 2:
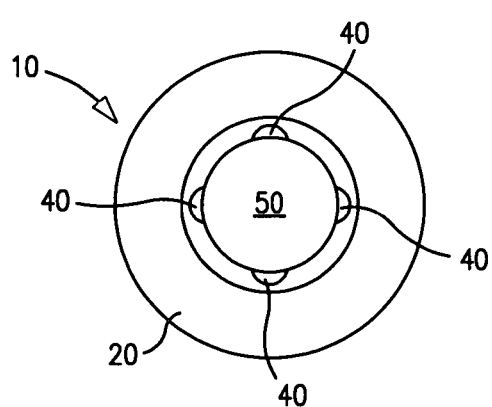
FIG. 2 is a top view of the integrated lamp of FIG. 1.
Figure 3:
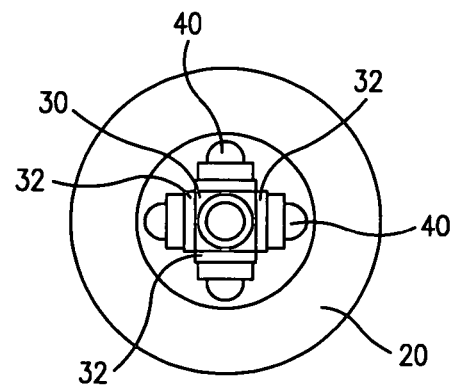
FIG. 3 is a top view of the integrated lamp of FIG. 1, with the collimating lens 50 removed for clarity.

An exemplary embodiment of an integrated LED warning and vehicle lamp 10 will be described with reference to FIGS. 1–6. FIG. 1 is an enlarged side view of an integrated LED warning and vehicle lamp 10 (hereinafter "integrated lamp 10") according to aspects of the present invention. The integrated lamp 10 is configured to be a direct replacement for an existing vehicle signal lamp. "Direct replacement" in the context of this application means that the integrated lamp 10 is configured for installation in the reflector shell in place of a vehicle lamp and without modification of the reflector shell. The integrated lamp 10 is equipped with a base 20 configured for reception in the hole 92 provided in the reflector shell 90 for the vehicle lamp being replaced. Lamp bases are typically received in the hole and secured by a bayonet connection or the like. The integrated lamp 10 has a physical structure compatible with the interior volume and focal characteristics of the reflector shell. These aspects of the invention allow installation of the integrated lamp 10 in place of an existing vehicle lamp without physical modification to the vehicle. Integrating the warning signal function with the vehicle signal function(s) of the lamp being replaced on the same physical structure permits the light emitters for producing the warning and vehicle signals to be arranged at or close to the focus of the reflecting surface of the reflector shell.

Figure 4:
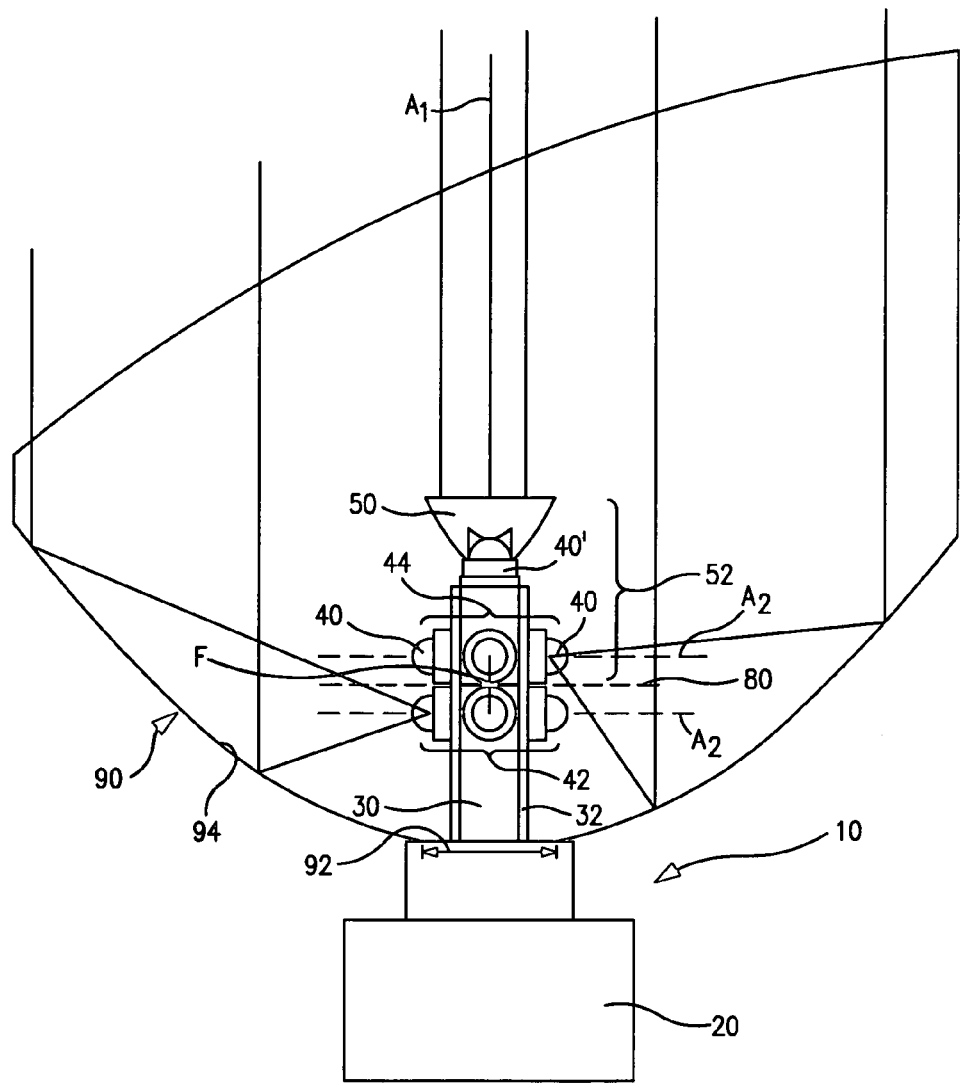
FIG. 4 is a side sectional view through a representative reflector shell and an installed integrated lamp.

With reference to FIGS. 1 and 4, a lamp support post 30 extends from a base 20 to provide an attachment point for a plurality of light-emitting diodes 40. In the exemplary embodiment, the support post 30 is square in section and extends outwardly through the focal point F of the reflector shell 90. The outside surfaces of the support post 30 are substantially planar rectangular surfaces, the end of the support post 30 being a substantially planar square surface. In the context of the present invention, it is desirable that the support post 30 be constructed from heat-transmissive material to function as a heat sink for the light-emitting diodes 40 attached thereto.

The LEDs 40 are high-output LEDs of the type manufactured by LUMILEDS® of San Jose, Calif. under the LUXEON® brand. LUXEON® LEDs come in a variety of lens configurations and colors. The illustrated LEDs are LUXEON® emitters having the lambertian or high-dome lens configuration. This lens configuration emits light in a symmetrical half-dome around an optical axis $A_1$, $A_2$ of the LED. The LEDs 40 emit light when energized by low-voltage direct current (DC). The light output of the LED increases with increasing current such that different levels of applied current will produce different levels of light output.

When energized, the LEDs 40 produce significant amounts of heat that must be removed to prevent overheating and damage to the LEDs. Heat removal is typically accomplished by securing the base or "slug" of the LED in heat-transmissive relationship to a heat-conductive PC board. Such a PC board may be a typical fiberboard provided with heat-conductive copper pads and through-holes or may be a metal-core PC board as is known in the art. The PC board is typically equipped with electrical leads for connecting the LED(s) to each other and to electrical circuits producing the energizing current.

It will be understood by those of skill in the art that the power requirements for the LEDs 40 of the integrated lamp 10 may be quite different from the power applied to the vehicle lamp being replaced. Further, modern vehicles may sense the presence or absence of continuity through the filament(s) of the vehicle lamp to provide indications of lamp malfunction. Therefore, it will likely be necessary to provide an interface electrical circuit between the integrated lamp 10 and the relevant vehicle electrical systems. The interface electrical circuit will modify vehicle power to the proper voltage and current for the LED(s). The interface electrical circuit may also mimic a properly functioning vehicle lamp to avoid spurious indications of lamp malfunction. The interface electrical circuit will be responsive to the vehicle signaling systems that formerly energized the vehicle lamp. To the vehicle, the integrated lamp 10 will appear and behave identically to the vehicle lamp being replaced.

An aspect of the present invention relates to the dual functionality of the integrated lamp 10. One function of the integrated lamp 10 is to duplicate the vehicle light signals such as turn signals, brake lights or running lights formerly generated by the vehicle lamp. The vehicle light signals and illumination produced by the integrated lamp must meet the light intensity and distribution pattern standards established for the relevant vehicle signals or lamps. The second function of the integrated lamp is to produce a warning signal illumination pattern meeting the intensity and distribution pattern requirements established for emergency vehicle warning light signals.

With reference to FIGS. 1 and 4, the exemplary integrated lamp 10 includes a total of nine high-output LEDs 40. Eight of the LEDs are mounted to the lamp support post in two circumferential rows 42, 44. Each row 42, 44 includes one LED 40 secured to each longitudinal face of the lamp support post 30. The row 42 of LEDs 40 closer to the base 20 is dedicated to replacing the vehicle signal functions, while the outward row 44 and axial LED 40' (together 52) are dedicated to generating the warning light signal. Dashed line 80 in FIGS. 1 and 4 indicates an approximate focal distance defined by a reflecting surface 94 of the reflector shell 90. An aspect of the present invention relates to placing the rows 42, 44 of radial LEDs 40 as close to the focus F of the reflector shell 90 as possible. In the context of the present invention, the parallel rows 42, 44 of LEDs 40 are respectively placed immediately within and immediately beyond the focal distance 80 of the reflector shell.

An aspect of the present invention relates to placement of an axial LED 40' on the outward end of the lamp support post 30. This LED 40' is equipped with a collimating (internally reflecting) reflector 50 which organizes light from the axial LED 40' to a path substantially parallel to an axis $A_1$ defined by the lamp support post 30. The path of the collimated light from the axial LED 40' is also substantially parallel to the optical axis $A_1$ of the axial LED 40'. The four radial light emitters 40 of row 44 fill the vehicle reflector with light when energized to generate the warning light signal. The axial LED 40' is typically energized simultaneously with the radial LEDs of row 44 to provide additional straight-ahead intensity to the generated warning light signal. The LEDs 52 connected to generate the warning light signal are energized in a selected pattern at current levels equal to or slightly above the maximum rated current $I_{max}$ for the LEDs. $I_{max}$ is typically between approximately 350 mA anc 450 mA for a one-watt LUXEON® emitter depending on the color and batch. The LEDs are mounted with their slugs in heat-transmissive relationship to heat-conductive PC boards 32, which are in turn secured to the lamp support post 30 in heat-transmissive relationship. This arrangement removes heat from the LEDs 40, 40' efficiently, preventing overheating, and allowing the application of maximum current to the LEDs.

The four LEDs 40 of the inward row 42 are electrically connected to the relevant vehicle systems via an interface electrical circuit 60. The interface electrical circuit 60 responds to the vehicle systems to provide an appropriate energizing current to the LEDs of the inner row 42 in a pattern to reproduce the relevant vehicle signal. For example, to reproduce a turn signal, the LEDs are provided with maximum current $I_{max}$ in an equally timed on/off sequence. To reproduce running lights, the LEDs are continuously energized at a less than maximum current. To reproduce a brake signal, the LEDs 40 are provided with maximum current for as long as the brake signal is transmitted from the relevant vehicle system. Dual functions, such as running and brake lights, can be reproduced by applying continuous lower current with intermittent maximum current to the LEDs 40 of row 42.

Figure 5:
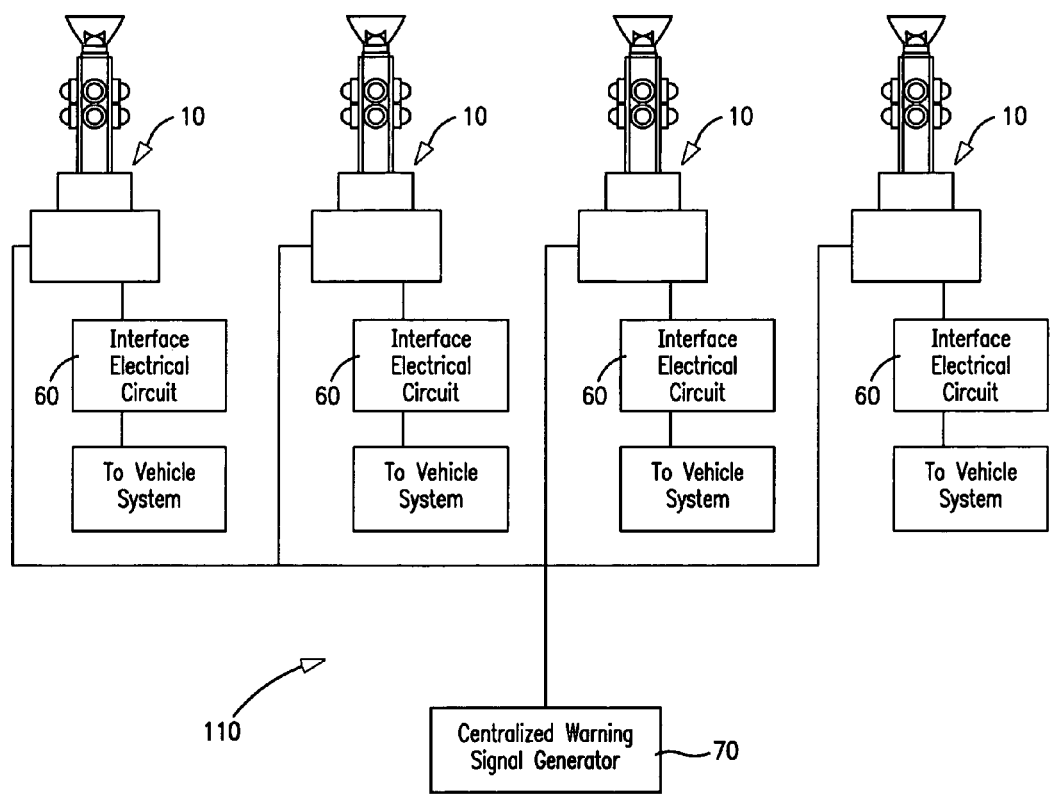
FIG. 5 is a functional block diagram of an exemplary integrated vehicular lamp and warning light system according to aspects of the present invention.
Figure 6:
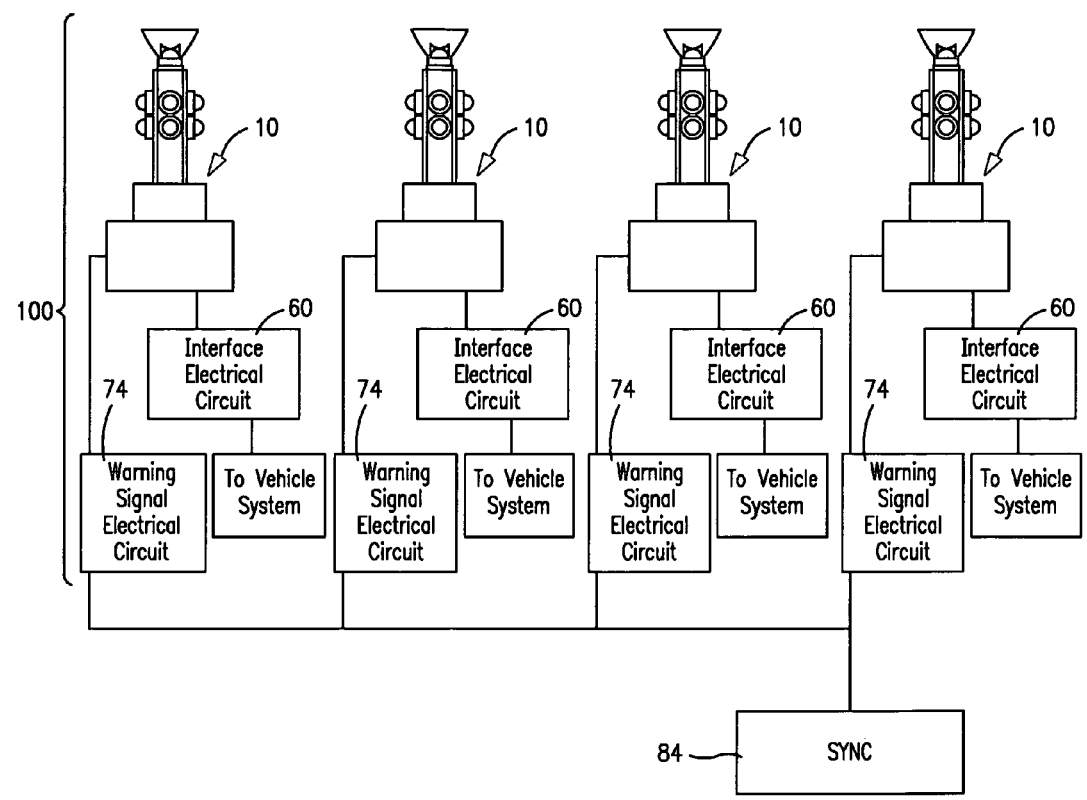
FIG. 6 is a functional block diagram of an alternative exemplary integrated vehicular lamp and warning light system according to aspects of the present invention.

With reference to FIGS. 5 and 6, there are a variety of ways to construct the electrical circuitry and connections to coordinate the light signals generated by the integrated lamp 10 with the light signals of the other integrated lamps and relevant vehicle systems. FIG. 5 illustrates a first embodiment of an integrated vehicular lamp and warning system light system 110. In the arrangement of FIG. 5, a centralized warning signal generator 70 generates a coordinated set of electrical signals that are transmitted to the LEDs of the integrated lamps 10. The centralized generation and distribution of electrical signals to multiple warning signal light generators is known in the art. This arrangement produces a coordinated warning signal light pattern from the multiple integrated lamps 10. It will be noted that each of the integrated lamps 10 in FIG. 5 is also provided with an interface electrical circuit 60. The interface electrical circuit 60 provides appropriate levels of energizing current to some of the integrated lamp LEDs 40 in patterns to reproduce the relevant vehicle signal as described above.

FIG. 6 illustrates an alternative integrated vehicular lamp and warning signal light system 100 in which each integrated lamp 10 is provided with its own warning signal electrical circuit 74. The individual warning signal electrical circuits may comprise a microcontroller programmed with one or more warning light signal patterns and the circuitry necessary to generate energizing current to produce the relevant warning light signal. The warning signal electrical circuits 74 will typically be configured to generate the same or complementary warning light signals when energized. FIG. 6 shows a synchronizing electrical connection 84 between the several integrated lamps 10. Such a synchronizing electrical connection 84 can be employed to coordinate the timing of the warning light signals generated by the integrated lamps 10. Alternatively, the integrated lamps 10 may be permitted to generate their warning light signals without reference to the signals generated by the other integrated lamps 10. The integrated lamps 10 of FIG. 6 are also provided with interface electrical circuits 60 that function as described above.

Exemplary embodiments illustrating the structure for an integrated lamp and alternative electrical circuitry and system arrangements are described for purposes of explanation and are not intended as limitations of the invention herein. Alternative structures and electrical configurations may occur to one of skill in the art without departing from the spirit and the scope of the present invention.

What is claimed is:

1. An integrated vehicular lamp and warning signal light system for use in conjunction with a motor vehicle having electrically energized lamps in reflector shells, said lamps energized by vehicular systems to provide visual signals and/or illumination, said system comprising:
    a plurality of lamp assemblies including:
        a base configured for reception in a reflector shell of the vehicle as a direct replacement for the electrically energized lamp previously installed in the reflector shell;
        a support extending from the base;
        a plurality of LEDs mounted to said support;
        an interface electrical circuit connecting a first portion of said plurality of LEDs to a vehicular system which energized the electrically energized lamp being replaced, said electrical circuit configured to receive signals from said vehicular system and energize said first portion according to said signals; and
        a warning signal electrical circuit connected to a second portion of said plurality of LEDs to energize said second portion to produce a warning light signal.

2. The integrated vehicular lamp and warning signal light system of claim 1, wherein the warning signal electrical circuits of at least two of the plurality of lamp assemblies are electrically connected to synchronize the warning light signals generated by said at least two lamp assemblies.

3. The integrated vehicular lamp and warning signal light system of claim 1, wherein said support comprises a post defining a longitudinal axis and extending from said base to an end spaced from said base and said plurality of LEDs includes an axial LED secured to the end of said post and provided with a collimating lens, said axial LED and lens positioned to emit light substantially parallel to said longitudinal axis.

4. The integrated vehicular lamp and warning signal light system of claim 3, wherein said axial light emitter is one of said second portion of LEDs.

5. The integrated vehicular lamp and warning signal light system of claim 1, wherein said support comprises a post having an outside surface, said post being constructed of thermally transmissive material and said plurality of LEDs are mounted in thermally transmissive relationship to said post.

6. The integrated vehicular lamp and warning signal light system of claim 5, wherein said post is a regular polygon in section, said regular polygon having a plurality of substantially planar sides defining said outside surface, each of said sides having at least one LED mounted thereto.

7. The integrated vehicular lamp and warning signal light system of claim 5, wherein said LEDs are mounted in thermally transmissive relationship to thermally transmissive PC boards, which are in turn mounted in thermally transmissive relationship to the outside surface of said post.

8. The integrated vehicular lamp and warning signal light system of claim 1, wherein each said reflector shell defines a focal point F at a first distance from said shell, said support is a post defining a longitudinal axis extending through said focal point F, each of said plurality of LEDs includes an optical axis and at least one of each of said first and second portions of said plurality of LEDs are mounted to said post with their optical axes substantially perpendicular to said longitudinal axis.

9. The integrated vehicular lamp and warning signal light system of claim 1, wherein each said first and second portion of said plurality of LED'ss each includes a plurality of angularly spaced LEDs arranged at a substantially equal axial distance from said base and positioned to emit light in a pattern substantially surrounding said support.

10. The integrated vehicular lamp and warning signal light system of claim 1, wherein said support comprises a post defining a longitudinal axis and at least one lamp assembly comprising a lens configured to re-direct light from at least one of said plurality of LEDs to a direction substantially parallel to said longitudinal axis.

* * * * *